(No Model.)

W. W. COON.
SHAFT FOR GRINDSTONES.

No. 332,996. Patented Dec. 22, 1885.

WITNESSES:
Fred G. Dieterich.
Maurice Delmar.

Willard W. Coon
INVENTOR.
By Louis Bagger & Co.
ATTORNEYS.

N. PETERS, Photo-Lithographer, Washington, D. C.

UNITED STATES PATENT OFFICE.

WILLARD W. COON, OF PALISADE, ASSIGNOR OF ONE-THIRD TO T. F. LEAVITT, OF SIOUX FALLS, DAKOTA TERRITORY.

SHAFT FOR GRINDSTONES.

SPECIFICATION forming part of Letters Patent No. 332,996, dated December 22, 1885.

Application filed March 14, 1885. Serial No. 158,824. (No model.)

*To all whom it may concern:*

Be it known that I, WILLARD W. COON, a citizen of the United States, and a resident of Palisade, in the county of Minnehaha and Territory of Dakota, have invented certain new and useful Improvements in Shafts for Grindstones, and I do hereby declare that the following is a full, clear, and exact description of the invention, which will enable others skilled in the art to which it appertains to make and use the same, reference being had to the accompanying drawings, which form a part of this specification, and in which—

Figure 1:
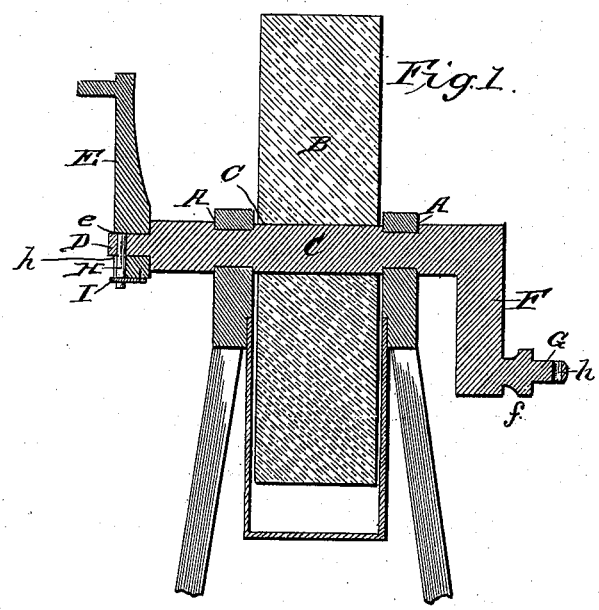
Figure 2:
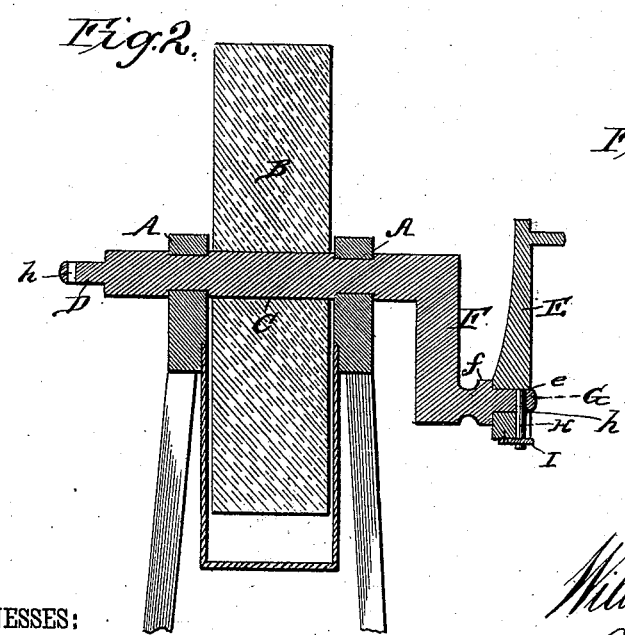
Figure 3:
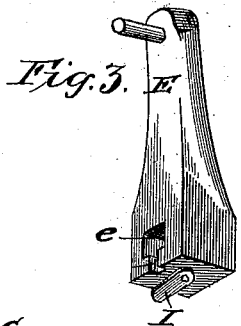

Figure 1 is a vertical cross-section of the trough and bearings of a grindstone provided with my improved shaft. Fig. 2 is a similar view showing the crank and handle for turning the grindstone by hand moved to and placed upon the other end of the shaft, and Fig. 3 is a detail view of the movable handle which is used for turning the stone by hand.

Similar letters of reference indicate corresponding parts in all the figures.

The shafts of grindstones, as usually made for the use of farmers, blacksmiths, and general use, are ordinarily provided with a crank and handle at one end for turning the stone by hand, and with a shorter crank at the other end adapted to be connected to a pitman and treadle for turning the stone by foot-power.

In sharpening the sickle-bars of harvesters it is very difficult, and often impossible, to work the stone by hand-power, on account of the position of the crank for turning it, which causes the handle and the arm of the operator to be in the way, necessitating the removal of the sickle-bar at each turn while the crank passes it by, thereby wearing the stone unevenly, which is very objectionable, and causing also considerable loss of time.

It is the object of my improvement to overcome this difficulty by constructing the shaft and hand-crank in such a manner that the latter may be adjusted so as to be entirely out of the way when the stone is used for the sharpening of sickle-bars, &c.; and to this end my invention consists in the improved shaft which will be hereinafter more fully described and claimed.

In the accompanying drawings, A denotes the bearings for the shaft, and B the grindstone, which is fastened upon a squared middle part of the shaft. (Shown at C.) On one end the shaft has a square projection, D, for the attachment of the hand-crank and handle E, and at the other end the shaft has a fixed crank, F, having a wrist-pin or projection, *f*, for the attachment of the pitman or connecting-rod which connects crank F with the treadle. (Not shown in the drawings.) Projecting from the wrist-pin *f* is a square stud, G, of the same size and shape as the projection D at the other end of the shaft. The handle-crank E has a square aperture, *e*, which will fit upon either of the projections D or G, and the crank, when placed upon either of these, is held in place by a pin or key, H, inserted through a hole, *h*, in the crank projections, and prevented from slipping out of the same by a pivoted latch, I, adapted to engage a notch in the key.

From the foregoing description, taken in connection with the drawings, the operation of my improved grindstone-shaft will readily be understood without requiring extended explanation. When the stone is used for general purposes—such as the sharpening of knives, axes, and other tools—the handle E is inserted upon the projection D, as shown in Fig. 1; but when it is desired to use the stone for the sharpening of sickle-bars, &c., where the handle, when in this position, would be in the way and interfere with the working of the stone, the handle is removed from the projection D, and inserted upon the stud or projection G at the other end of the shaft, in which position it will be out of the way and not interfere with the continuous working of the stone.

Having thus described my invention, I claim and desire to secure by Letters Patent of the United States—

The improved shaft for grindstones herein shown and described, having at one end a projection for the attachment of a removable crank and handle for turning the stone by hand-power, and at the other end a fixed crank adapted to be connected to a pitman and treadle for turning the stone by foot-power, the said fixed crank having a stud or projection parallel to the shaft for the attachment of the removable handle, and having suitable means for locking said handle upon the same, substantially as and for the purpose set forth.

In testimony that I claim the foregoing as my own I have hereunto affixed my signature in presence of two witnesses.

WILLARD W. COON.

Witnesses:
FRANK C. BELL,
G. A. BANKSON.